United States Patent [19]

Buell

[11] 4,058,181
[45] Nov. 15, 1977

[54] MOTORCYCLE SUSPENSION SYSTEMS

[76] Inventor: Erik F. Buell, Box 418, R.D. No. 2, Gisbonia, Pa. 15044

[21] Appl. No.: 667,391

[22] Filed: Mar. 16, 1976

[51] Int. Cl.² .......................................... B62K 25/02
[52] U.S. Cl. ...................................... 180/32; 280/284
[58] Field of Search ............... 280/283, 284, 285, 286; 180/32; 267/20 R, 20 A

[56] References Cited

U.S. PATENT DOCUMENTS

| 3,917,313 | 11/1975 | Smith et al. | 280/284 |
| 3,974,892 | 8/1976 | Bolger | 280/284 |

FOREIGN PATENT DOCUMENTS

| 1,055,598 | 10/1953 | France | 280/285 |
| 441,146 | 10/1948 | Italy | 280/283 |
| 285,946 | 2/1928 | United Kingdom | 267/20 R |
| 104,022 | 2/1917 | United Kingdom | 280/284 |

*Primary Examiner*—Joseph F. Peters, Jr.
*Assistant Examiner*—Donn McGiehan
*Attorney, Agent, or Firm*—Buell, Blenko & Ziesenheim

[57] ABSTRACT

An improvement in motorcycle frames having a generally closed configuration with generally horizontal upper and lower frame members and spaced generally front and rear vertical members transverse to and connecting said upper and lower members to form a closed configuration and a power unit in said frame having a drive sprocket is provided in the form of a pair of spaced generally horizontally extending swing arms on each side of said frame and a rear wheel, said arms extending rearwardly from the rear member and each pivoted adjacent one end on said frame, a generally vertical link connecting the other ends of said swing arms and receiving an axle shaft for the rear wheel intermediate the two swing arms, spring means pivotally connected at one end to at least one swing arm of each pair of swing arms at the other end to at least one of the other swing arms and the frame and link means in one of said pivot connections of said spring means whereby deflection of said swing arms from a first normal position upwardly around their pivot at the frame causes a progressively rising rate of deflection of said spring means.

5 Claims, 5 Drawing Figures

MOTORCYCLE SUSPENSION SYSTEMS

This invention relates to motorcycle suspension systems and more particularly to a rear suspension for motorcycles.

Typically the rear suspension of a motorcycle consists of a bi-furcated swing arm, pivoted at its closed base at the frame adjacent the motor, with the rear wheel mounted on a shaft fixed at the open ends of the swing arm. A pair of shock absorbers surrounded by springs are mounted between the frame and the swing arms. This typical structure has a variety of problems which have remained unsolved. First, the contact patch of the rear tire moves during suspension travel. Second, the whee base changes during suspension movement. Third, the movement of the swing arm causes changes in chain tension which in turn detrimentally effect the suspension action. Finally, the shock absorber and spring assembly units do not satisfactorily absorb the shocks of travel over rough surfaces and cause the motorcycle to tend to rotate about the front wheel and lose rear wheel road traction.

These problems have long been recognized but no satisfactory solution has heretofore been available. For example, Filkens U.S. Pat. No 3,877,539 proposes a solution to the problem of springing and shock absorbing which utilizes a spring and shock absorbing unit which moves through a tube connected to the sterring head. Richardson U.S. Pat. No. 3,907,332 on the other hand provides a conventional swing arm but utilizes a single shock absorber and spring mounted on one end of a bell crank while the other end of the bell crank is connected to a pusher rod extending to the swing arm. Both of these devices are mono-shock assemblies designed to provide a rising rate of shock absorption. They do not provide any relief for problems one, two and three discussed above, but are addressed solely to solving the final problem.

It has become of note recently that motorcycle suspension design had been lagging behind the development of most other components on the vehicle. This observation has caused considerable interest in the action and design of suspension units, especially the rear units on the motorcycle.

Most of the development recently done has been in the area of off-road motorcycles. The designs (Yamaha's monoshock, cantilevered, forward-mounted, and long-travel shocks), have all utilized a greatly increased amount of wheel travel. This allows the use of softer springs without bottoming, for smoother ride and better control. These long travel suspensions, however, have found little use on street and pavement racing (road racing) motorcycles, because of the radical changes in steering geometry and ground clearance brought about by the action of long-travel. With the increased speeds and cornering forces on paved surfaces, these problems far outweigh the advantages.

I propose a system of rear suspension which provides a solution to these problems, as well as to several others which apparently have not been previously dealt with.

The system provides a rising rate of both springing and dampening as a function of two changing angles, which allows the wheel to have soft shock absorbing characteristics over minor surface irregularities, and a progressively greater rate as larger bumps are traversed. An additional advantage of these progressive characteristics is that under the high cornering forces provided by the increased traction of modern tires and banked corners, the suspension will not bottom out, and will retain proper shock absorbing capabilities.

A second important feature of this system is found in the variable weight loading distribution on the motorcycle provided by the action of the two sets of swinging arms. Under acceleration, the forward thrust is transferred through the arms as a function of both the distance of the axle from the center of the suspension upright, and the angles of the arms to the upright. Therefore, the positioning of these components can be variously chosen during design, according to the amount of weight which is desired to be transferred. This makes the system applicable to all various types of motorcycles; from a high horsepower pavement bike which needs much force transferred to the front wheel during acceleration, to a small displacement trials bike on which it is desirable to be able to lift the front wheel to clear obstacles.

The double swing arm arrangement also provides the advantage of having a suspension upright which keeps the contact patch of the tire close to constant (depending on the length and angles of the swing arms) as the suspension moves. Present state of the art systems add 2.5 to 5 inches of their own lateral motion to the contact patch as the suspension moves, which can induce a skid if the tire is already near its maximum traction level.

A fourth advantage is that this system permits the placing of the front sprocket in line with the front swing arm pivot points, which would keep the chain in constant tension and would keep the forces through the chain from affecting the suspension movement. Constant chain tension would also more easily allow the use of an inboard rear brake and/or an enclosed oil bath for the chain, with their respective advantages.

The design also reduces the torsional loads on the swing arms, swing arm bearings, and their mounting points on the frame, by decreasing the leverage of the wheel over each swing arm. This allows freer suspension movement and controls deflection of the wheel about the lateral axis of the motorcycle when traversing bumps during cornering.

Finally, the shock loadings on the frame are converted mostly to tension loadings due to the free-mounted shocks; these forces are more easily controlled by the standard tubular frame design.

I provide a motorcycle frame having a generally closed configuration including upper and lower generally horizontal frame members and spaced generally front and rear vertical members transverse to and connecting said upper and lower frame members to form the closed configuration, a pair of spaced generally horizontally extending swing arms on each side of said frame extending rearwardly from the rear member and each pivoted adjacent one end on said rear member, a generally vertical link connecting the other ends of said swing arms and adapted to receive the axle shaft of the rear wheel intermediate the two swing arms, spring means pivotally connected to one end to at least one swing arm of each pair of swing arms and at the other end to at least one of the other spring arm and the frame and link means in one of said pivot connections of said spring means whereby deflection of said swing arms from a first normal position upwardly around their pivot at the frame causes a progressively rising rate of resistance to deflection rather than a constant linear increase in resistance. Preferably the two swing arms on each side are pivoted on the frame substantially equally spaced one above and one below a horizontal line through the power unit drive sprocket. In a preferred form of my invention the upper swing arm member on each side is provided with an extended arm beyond the pivot on the frame member forming a generally bell crank shape and the spring is pivoted at one end on the free end of this extended arm and at its other end on the lower swing arm intermediate its length. A shock absorber is preferably enclosed in or encloses each spring member and is coupled to the ends of said spring member.

In the foregoing general description I have set out certain objects, purposes and advantages of my invention. Other objects, purposes and advantages will be apparent from a consideration of the following description and the accompanying drawings in which.

Figure 1:
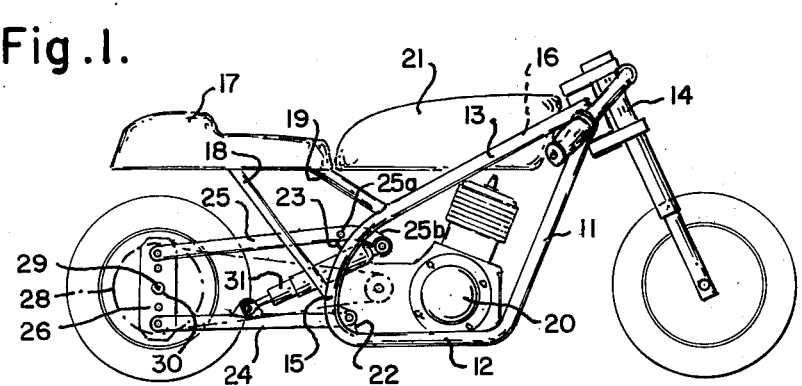
FIG. 1 is a side elevational view of a motorcycle incorporating this invention.

Referring to the drawings I have illustrated a motorcycle 10 having a frame 11 in the form of a closed configuration of generally parallelogram shape with a lower generally horizontal member 12, an upper generally horizontal member 13, a front generally vertical member 14, a rear generally vertical member 15, a top strengthening member 16 and a generally rearwardly extending auxiliary portion designed to support the seat 17 and made up of a rearwardly and upwardly extending frame member 18 and a rearwardly, generally horizontal member 19 forming with frame member 15 a generally triangular frame. The frame 11 carries a motor and transmission assembly 20 and a gasoline tank 21 in usual fashion. The particular configuration of the frame of the motorcycle is not critical and any configuration may be used, however, the shape here described is one most commonly used, generally in a double configuration with a pair of such frame assemblies mounted side-by-side and connected by transverse members and gusset plates.

A gusset plate 22 is connected at the junction of lower member 12 and rear member 15, and a second gusset plate 23 is connected at the junction of vertical members 15 and 18. Pivotally secured to plate 22 is a rearwardly extending horizontal swing arm 24. A second rearwardly extending swing arm 25 is pivoted adjacent one end in gusset plate 23. The other end of each of swing arms 24 and 25 is pivoted at opposite ends of a vertical link 26 so that the arms are spaced apart and generally parallel. The rear wheel 28 is journalled on shaft 29 in opening 30 in link 26. The said one end of swing arm 25 extends angularly downwardly from the pivot point 25a in gusset plate 23 so that a bell crank 25b is formed. Shock absorber 31 and spring 32 are jointly connected at one end to plate 32 intermediate the ends of arm 24 and at the other end to the free end of bell crank arm 25b. This combination of spring and shock absorber can be any of the conventional types used in motorcycles, e.g. the coil over type or the internal coil type, or any other equivalent type. The length of the bell crank arm 25b in any given system will determine the progression of the rise in the spring pressure and in order to make this adjustable for different riding conditions, additional mounting positions 25c, 25d, 25e may be provided. This arrangement provides a rising rate suspension which places the load on the swing arms. It provides a soft ride for minor deflections and yet a rapidly increasing rate of resistance to major deflections and a rapid return to normal from such deflections thus reducing the likelihood of "bottoming" and the tendency of the rear wheel to leave the road surface when recovering from major surface deflections. In addition the system, because of the generally parallel swing arm arrangement maintains substantially constant chain tension, maintains a substantially constant contact patch and minimizes wheel base change during suspension movement. In addition by providing several mounting holes 30, 30a and 30b in link 26, it is possible to change the drive angle through the frame and thus change the pressure of the front wheel on the roadway. This can be particularly useful in racing cycles of various types.

Figure 2:
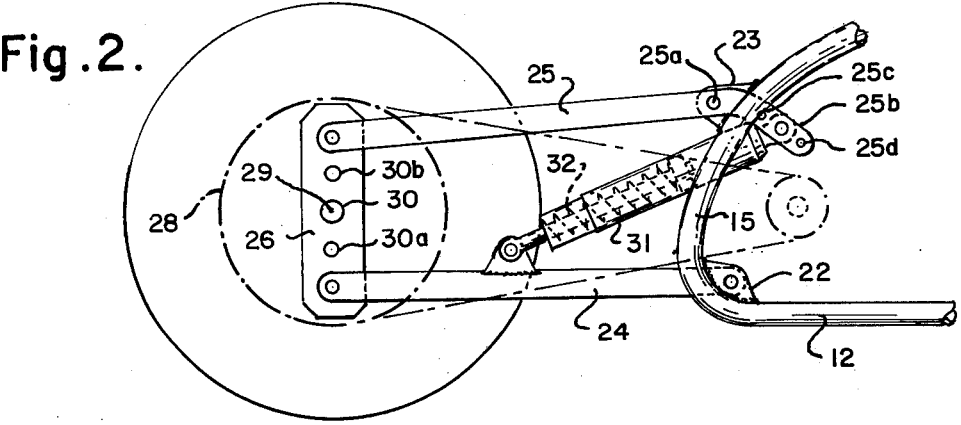
FIG. 2 is a fragmentary enlarged side elevation of the suspension system of this invention as incorporated in FIG. 1.
Figure 3:
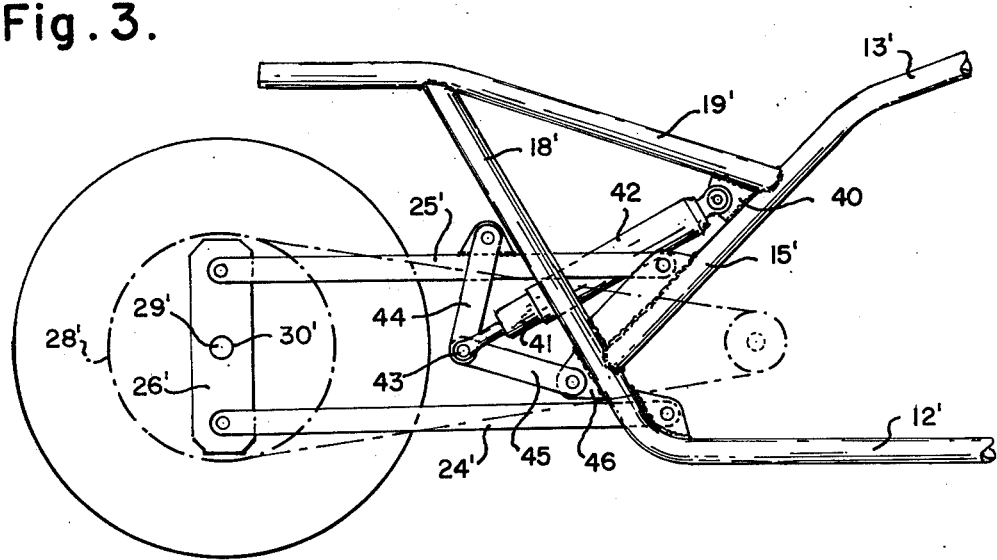
FIG. 3 is a side elevational view of a second embodiment of suspension according to this invention.

In FIG. 3 I have illustrated another embodiment of my invention in which those parts which find their counterparts in FIGS. 1 and 2 are given like numerals with a prime sign. In this embodiment a gusset plate 40 is formed at the junction of frame members 15' and 19' and one end of a combination spring 41 and shock absorber 42 is pivoted thereon. The other end of the combination spring 41 and shock absorber 42 is pivoted at the pivot point 43 of links 44 and 45 which are pivotally attached at the ends opposite the pivot point 43 on upper swing arm 25' and on plate 46 on frame member 18'. The links 44 and 45 are arranged in length so that as the swing arms pivot upwardly, pivot point 43 moves toward gusset plate 40 compressing the spring at a progressively rapid rate, which rate of progression is dependent upon the relative lengths of the links 44 and 45 to one another and to the position of the pivot point of link 44 on arm 25'.

Figure 4:
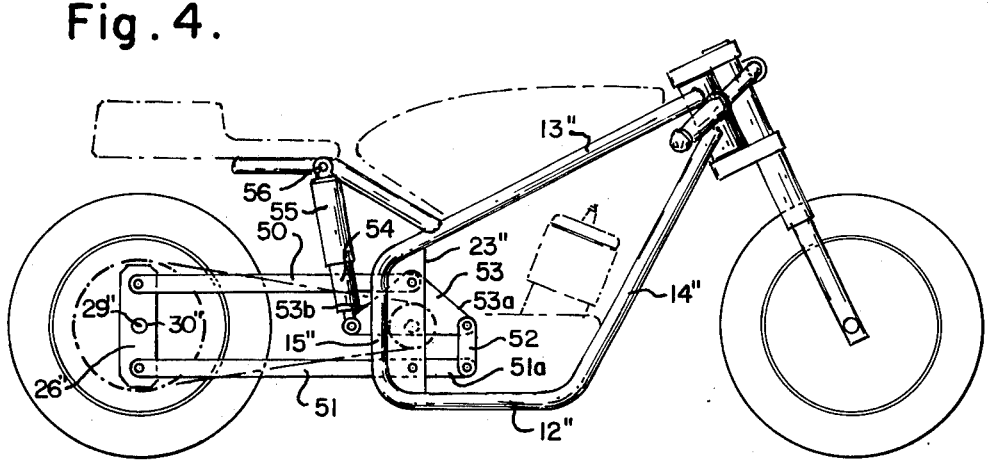
FIG. 4 is a side elevational view of a third embodiment of suspension according to this invention.

In FIG. 4 I have illustrated another embodiment of suspension according to my invention. Again like parts are given like numerals to those of FIGS. 1 and 2 but with a double prime suffix. In this embodiment I provide upper and lower parallel swing arms 50 and 51 respectively pivoted at one end to vertical link 26" carrying the wheel axle shaft 29" in hole 30". The opposite end of arm 50 is pivotally mounted in gusset plate 23'. The opposite end of arm 51 is pivoted at a point spaced from its end leaving an overhanging lever arm 51a which is pivotally connected to one end of vertical link 52. The other end of vertical link 52 is pivotally connected to a corner of a scalene triangular member 53 which is pivoted at its apex on the frame. The other corner of member 53 is connected to one end of a spring 54 and shock absorber 55 assembly. The other end of the spring and shock absorber assembly is fixed to gusset plate 56 on the frame 11". The rate of progressive increase in the spring is governed by the difference in the lengths of the two sides 53a and 53b of triangular member 53 and can be changed for different conditions, simply by changing member 53.

Figure 5:
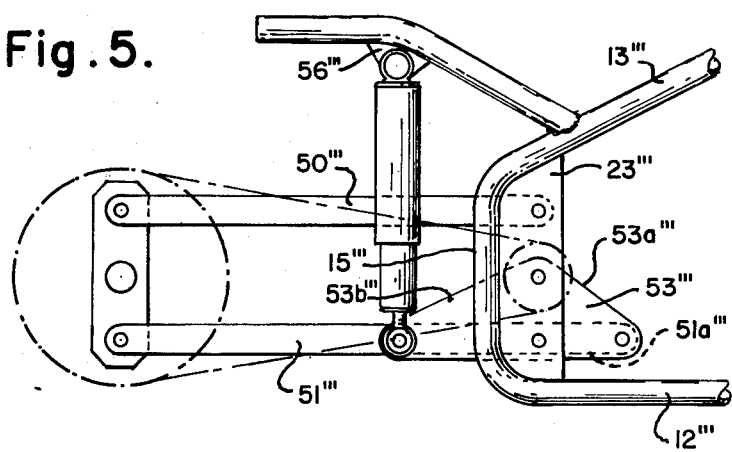
FIG. 5 is a side elevational view of a fourth embodiment of suspension according to this invention.

In FIG. 5 I have illustrated a fourth embodiment which is essentially the same as that of FIG. 4 except that link 52 of FIG. 4 has been eliminated. Like parts are given like numerals with a triple prime suffix.

In the foregoing specification I have set out certain preferred embodiments and practices of this invention, however, it will be understood that this invention may be otherwise embodied within the scope of the following claims.

I claim:

1. In a motorcycle frame having a generally closed configuration having generally horizontal upper and lower frame members and spaced generally front and rear vertical members transverse to and connecting said upper and lower members to form the closed configuration, a power unit in said frame, having a drive sprocket, the improvement comprising a pair of spaced generally horizontally extending swing arms on each side of said frame and rear wheel extending rearwardly from the rear member and each pivoted adjacent one end on said frame, a generally vertical link connecting the other ends of said swing arms and adapted to receive an axle shaft of the rear wheel intermediate the two swing arms, link means connected at one end to one arm of one of said pairs of swing arms, spring means pivotally connected at one end to one of a swing arm of the other pair of swing arms and the frame and at the other end to said link means at its other end said link meas being relatively proportioned to the spring means connection at said one end so that deflection of said swing arms from a first normal position upwardly around their pivot at the frame causes a progressively rising rate of deflection of said spring means, while maintaining both a substantially constant contact patch between the rear wheel and a surface being travelled and a substantially constant wheel base.

2. A motorcycle frame assembly as claimed in claim 1, wherein the upper swing arm extends beyond its pivot at the frame and is bent downwardly forming with the swing arm a bell crank lever and the spring means is connected at one end to the end of said bell crank lever and at the other end to the lower swing arm intermediate its length.

3. A motorcycle frame assembly as claimed in claim 1 wherein the two swing arms are pivoted on the frame substantially equally spaced, one above and one below a horizontal line through the power unit drive sprocket.

4. A motorcycle frame assembly as claimed in claim 1 wherein a shock absorber is combined with the spring means and uses common connections therewith on the swing arms and frame.

5. A motorcycle frame assembly as claimed in claim 1 wherein the link means is a scissor link assembly extending between one swing arm and the frame, said scissors link comprising a pair of link arms connected together at one end of each, the other end of one link being connected to said one swing arm intermediate its length and the other end of the other link being connected to the frame and wherein the spring means is connected at one end to the frame and at the other end to the scissors link at the point where the two links are interconnected, said scissor links being proportioned in length so that the spring means is compressed at a rate faster than the lineal vertical motion of the swing arm.

* * * * *

UNITED STATES PATENT OFFICE
CERTIFICATE OF CORRECTION

Patent No. 4,058,181              Dated November 15, 1977

Inventor(s) ERIK F. BUELL

It is certified that error appears in the above-identified patent and that said Letters Patent are hereby corrected as shown below:

Column 1, line 16, "whee" should read --wheel--.

Column 1, line 29, "sterring" should read --steering--.

Column 2, line 59, "to" first occurrence, should read --at--.

Column 3, line 60, "crank 25b" should read --crank arm 25b--.

Column 4, line 47, "23'" should read --23''--.

Column 5, Claim 1, line 21, "meas" should read --means--.

Signed and Sealed this

Twenty-first Day of March 1978

[SEAL]

Attest:

RUTH C. MASON
Attesting Officer

LUTRELLE F. PARKER
Acting Commissioner of Patents and Trademarks